US012725856B2

(12) United States Patent
Antwerpen et al.

(10) Patent No.: US 12,725,856 B2
(45) Date of Patent: Sep. 1, 2026

(54) STORAGE CELL FOR AN ELECTRICAL ENERGY STORE HAVING CELL-INTERNAL HEATING, AND BATTERY FOR A MOTOR VEHICLE

(71) Applicant: Bayerische Motoren Werke Aktiengesellschaft, Munich (DE)

(72) Inventors: Korbinian Antwerpen, Reimlingen (DE); Sonia Dandl, Munich (DE); Simon Nuernberger, Bad Aibling (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 546 days.

(21) Appl. No.: 18/274,334

(22) PCT Filed: Jan. 25, 2022

(86) PCT No.: PCT/EP2022/051549

§ 371 (c)(1),
(2) Date: Jul. 26, 2023

(87) PCT Pub. No.: WO2022/161923

PCT Pub. Date: Aug. 4, 2022

(65) Prior Publication Data

US 2024/0088485 A1 Mar. 14, 2024

(30) Foreign Application Priority Data

Jan. 27, 2021 (DE) .................... 10 2021 101 804.8

(51) Int. Cl.
*H01M 10/658* (2014.01)
*H01M 10/615* (2014.01)
(Continued)

(52) U.S. Cl.
CPC ....... *H01M 10/658* (2015.04); *H01M 10/615* (2015.04); *H01M 10/625* (2015.04);
(Continued)

(58) Field of Classification Search
CPC ............ H01M 10/658; H01M 10/615; H01M 10/625; H01M 10/654; H01M 10/6555;
(Continued)

(56) References Cited

U.S. PATENT DOCUMENTS

2013/0108897 A1* 5/2013 Christian ........... H01M 10/647 429/50
2019/0010308 A1* 1/2019 Lips .......................... C08J 5/18
2022/0166117 A1 5/2022 Daub et al.

FOREIGN PATENT DOCUMENTS

DE 10 2012 219 747 A1 5/2013
DE 10 2017 206 080 A1 10/2018
(Continued)

OTHER PUBLICATIONS

English Translation of JP2012124319.*
(Continued)

*Primary Examiner* — Kiran Quraishi Akhtar
(74) *Attorney, Agent, or Firm* — Crowell & Moring LLP

(57) ABSTRACT

A cell for the electrochemical storage of electrical energy includes: a first sub-cell and a second sub-cell, which are each designed for the electrochemical storage of electrical energy; and a first electrolyte-stable insulation body for thermally insulating the first sub-cell and the second sub-cell from each other. The insulation body is arranged in an interstice between the first and second sub-cells, which is delimited by a side face of the first sub-cell and a side face of the second sub-cell, wherein the first insulation body has a first thermally insulating material having a thermal conductivity of at most 1 W/(m K) and a first heating structure designed to heat the first sub-cell and the second sub-cell, and wherein the first insulation body is electrically insulated from both the first sub-cell and the second sub-cell. A battery with such a cell and a vehicle with such a battery are also disclosed.

17 Claims, 2 Drawing Sheets

(51) Int. Cl.

| | |
|---|---|
| ***H01M 10/625*** | (2014.01) |
| ***H01M 10/654*** | (2014.01) |
| ***H01M 10/6555*** | (2014.01) |
| ***H01M 10/6571*** | (2014.01) |
| ***H05B 3/22*** | (2006.01) |

(52) U.S. Cl.
CPC ..... *H01M 10/654* (2015.04); *H01M 10/6555* (2015.04); *H01M 10/6571* (2015.04); *H05B 3/22* (2013.01); *H01M 2220/20* (2013.01)

(58) Field of Classification Search
CPC ........... H01M 10/6571; H01M 10/653; H01M 2220/20; Y02E 60/10; H05B 3/22
See application file for complete search history.

(56) References Cited

FOREIGN PATENT DOCUMENTS

| | | | | |
|---|---|---|---|---|
| DE | 10 2018 210 974 A1 | | 1/2020 | |
| DE | 10 2019 113 914 A1 | | 11/2020 | |
| JP | 2012-124319 A | | 6/2012 | |
| JP | 2012124319 | * | 6/2012 | ............. H01G 11/00 |
| JP | 2019-192379 A | | 10/2019 | |
| WO | WO2020001861 | * | 1/2020 | ........ H01M 10/0585 |
| WO | WO 2021/262960 A1 | | 12/2021 | |

OTHER PUBLICATIONS

English Translation of WO2020001861.*

International Search Report (PCT/ISA/210) issued in PCT Application No. PCT/EP2022/051549 dated May 24, 2022 with English translation (4 pages).

German-language Written Opinion (PCT/ISA/237) issued in PCT Application No. PCT/EP2022/051549 dated May 24, 2022 (6 pages).

German-language Search Report issued in German Application No. 10 2021 101 804.8 dated Oct. 25, 2021 with partial English translation (12 pages).

* cited by examiner

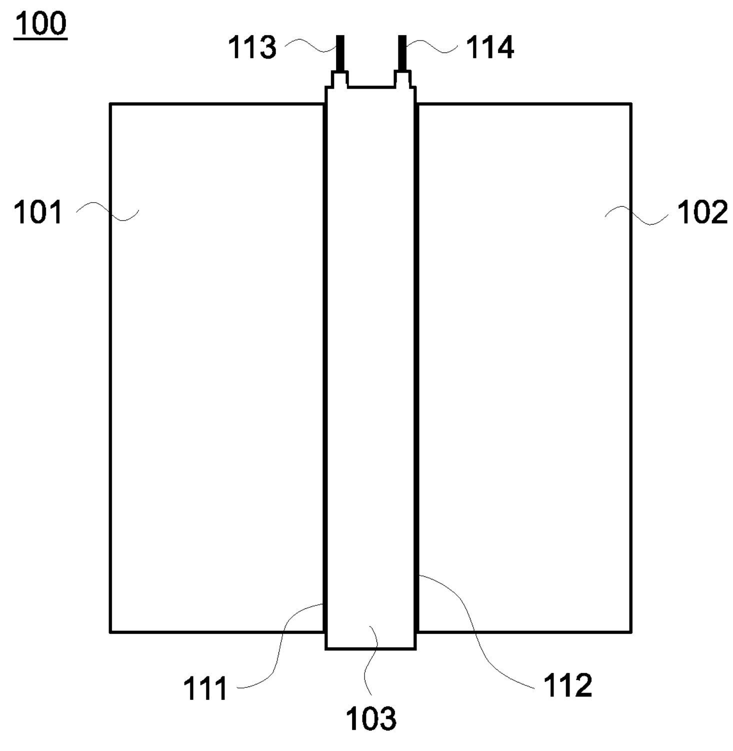
Fig. 1a
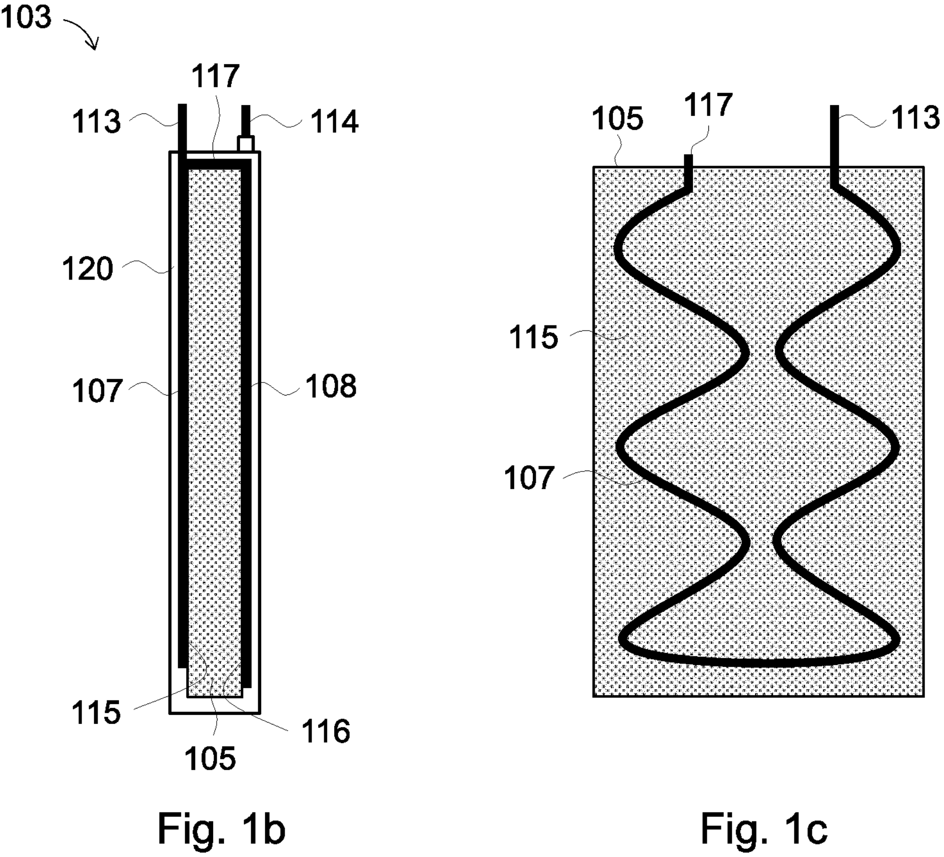
Fig. 1b
Fig. 1c

STORAGE CELL FOR AN ELECTRICAL ENERGY STORE HAVING CELL-INTERNAL HEATING, AND BATTERY FOR A MOTOR VEHICLE

BACKGROUND AND SUMMARY OF THE INVENTION

The present invention relates to a cell for electrochemically storing electrical energy and to a battery comprising such a cell.

The performance of lithium-ion cells is temperature-dependent. Particularly in the case of cells with high energy densities or with magnesium-rich cell chemistry, or when using solid electrolytes, the temperature-dependence of the power is very pronounced. At low cell temperatures there is a drop in retrievable power. The charging of the cells is heavily temperature-dependent as well. For rapid charging, the cell temperature is to be greater than 20° C. To enhance the performance of lithium-ion cells which are present at low temperatures, they are heated with a heating apparatus which is arranged in the vicinity of the cells to be heated. Where a large number of lithium-ion cells are heated by a single heating apparatus, it takes a long time for all of the cells to attain their operating temperature throughout their cell volume. While it is possible to shorten the time taken for all the cells to attain the operating temperature, by increasing the heating temperature of the heating apparatus, there is a consequent risk, particularly in the case of cells with high energy density, of a thermal runaway.

It is an object of the present invention, therefore, to provide a cell for electrochemically storing electrical energy wherein heating to its operating temperature is improved and the risk of thermal runaway of the cell (as a result of the heating itself and also otherwise) is minimized. The intention, furthermore, is to minimize the spread of thermal runaway from one cell to its adjacent cell and hence to minimize the risk of propagation of thermal runaway to all the cells of a battery.

This object is achieved in accordance with the teaching of the independent claims. Various embodiments and developments of the invention are subjects of the dependent claims.

A further object of the present invention is to provide a battery with which heating to its operating temperature is improved and the risk of thermal runaway and of potential propagation thereof is minimized.

This object is achieved in accordance with the teaching of the claims.

A further object of the present invention is to provide a vehicle which is safe and attains its full performance rapidly even at low temperatures.

This object is achieved in accordance with the teaching of the claims.

A first aspect of the invention relates to a cell for electrochemically storing electrical energy, comprising: a first subcell and a second subcell which are each designed for electrochemically storing electrical energy; and

- a first insulating body for thermally insulating the first subcell and the second subcell from each other, said body being arranged in an interspace between the first and second subcells that is confined by a side face of the first subcell and a side face of the second subcell,
- wherein the first insulating body comprises a first thermally insulating material having a thermal conductivity of at most 1 W/(m·K) and comprises a first heating structure which is designed to heat the first subcell and the second subcell, and
- wherein the first insulating body is electrically insulated both from the first subcell and from the second subcell. The first thermally insulating material is preferably also of low flammability.

As a result, the cell can be heated more rapidly and the risk of thermal runaway of the cell can be reduced.

A subcell may be designed as a cell stack or as a jelly roll. A subcell may be a lithium-ion cell. Examples of thermally insulating material that can be used are as follows: glass fiber, Kevlar, mica.

For the purposes of the present invention, the thermal conductivity is understood as the reciprocal of the specific thermal resistance. The thermal conductivity ($\gamma$) of a thermal insulating body, the heat flux density (dq/dt) through the thermal insulating body, and the temperature difference (gradT) which is the cause of the heat flux are related to one another as follows: $dq/dt=-\gamma\cdot \text{grad}T$. The unit of thermal conductivity is: W/(m·K) (watts divided by meters times kelvins).

For the purposes of the present invention, the thermal mass (C) or the heat capacity of a body, such as of a subcell, for example, is understood as the ratio of the heat supplied thereto (dQ) to the temperature increase brought about thereby (dT): $C=dQ/dT$. The unit of thermal mass is J/K (joules divided by kelvins).

The terms "encompasses", "includes", "contains", "comprises", "has", "with" as used herein, or any other variant of them, are not intended to cover a nonexclusive incorporation. For example, a method or an apparatus which encompasses or comprises a list of elements is not necessarily restricted to those elements, but may instead include other elements which are not expressly recited or which are inherent to such a method or such an apparatus.

Additionally, "or", unless expressly indicated to the contrary, relates to an inclusive "or" and not to an exclusive "or". For example, a condition A or B is met by one of the following conditions: A is true (or present) and B is false (or not present), A is false (or not present) and B is true (or present), and both A and B are true (or present).

The terms "a" or "an" or "one" as used herein are defined in the sense of "one/one or more". The terms "another" and "a further", and also any other variant thereof, are to be understood in the sense of "at least one further".

Described below are preferred embodiments of the first aspect of the invention and developments thereof, which may in each case, insofar as this is not expressly ruled out or is technically impossible, may be combined arbitrarily with one another and also with the other, further aspects of the invention that are described.

In one preferred embodiment, the first thermally insulating material has a thermal conductivity which is less than 0.3 W/(m·K). It is possible as a result to minimize the risk of thermal runaway of the cell. In one preferred embodiment, the first heating structure comprises two heating elements, the first thermally insulating material is designed as a plate which has a first surface and a second surface opposite the first surface, the first surface and the second surface each face one of the interspace-confining side faces of the first and second subcells, and a heating element of the first heating structure is arranged on each of the first surface and the second surface.

As a result, the heating temperature of each of the heating elements may be lowered to an extent such that the risk of thermal runaway of the cell, triggered by the heating with the heating elements, is ruled out. The heating temperature of a heating element is the temperature to which it must be heated in order to increase the temperature of the subcell it heats to the (optimal) operating temperature. The heating temperature may be 70° C., for example. Each of the two heating elements may be designed as a (serpentine) resistance track. This resistance track may comprise one of the following or combination thereof: aluminum, nickel, copper, graphene-silver, silver paste as printed conductor track.

In one preferred embodiment, the heating element arranged on the first surface covers at least 50% of the first surface; and/or the heating element arranged on the second surface covers at least 50% of the second surface.

This makes it possible to increase the fraction of the interspace, confined by the two subcells, that has a thermal resistance beyond the thermal resistance of the first thermally insulating material, and so to reduce further the risk of thermal runaway of the cell. The fraction of the thermal resistance that goes beyond the thermal resistance of the first thermally insulating material is formed here by at least one of the heating elements.

In one preferred embodiment, each position on the first surface which is not covered by the heating element arranged on the first surface has a corresponding opposite point on the second surface which is covered by at least part of the heating element arranged on the second surface.

As a result, each position in the interspace confined by the two subcells has a thermal resistance which goes beyond the thermal resistance of the first thermally insulating material, and hence the risk of thermal runaway of the cell can be further reduced.

In one preferred embodiment, at least the heating element arranged on the first surface comprises aluminum.

As a result, the heating element can be implemented inexpensively and its fraction within the overall thermal resistance between the first and second subcells can be increased.

In one preferred embodiment, the first thermally insulating material is formed from two parallel, mutually facing plates, and the first heating structure comprises a heating element arranged at last sectionally between the two plates.

As a result, the heating element can be easily integrated into the insulating body and said body can have a simple overall construction.

Each of the two plates has a first surface and a second surface facing the first surface. The first surfaces each face one of the interspace-confined side faces of the first and second subcells, and the heating structure is arranged between the second surfaces of the two plates. The heating structure may be arranged on one of the two second surfaces or on both. With this embodiment, the heating temperature of the heating element is higher than in the case of the embodiment having two heating elements arranged on opposite surfaces of the insulating body. For example, the heating temperature of the heating element may be in a range between 120° C. and 150° C. The heating element arranged between the two plates may be designed as a (serpentine) resistance track. This track may comprise one of the following or a combination thereof: nickel, aluminum, copper, graphene-silver, silver paste as printed conductor track. Nickel or aluminum are preferred, since they have a lower thermal conductivity than copper.

In one preferred embodiment, the first subcell and the second subcell each have a thermal mass, and the thermal masses of the first and second subcells differ from each other by not more than 5% of the lesser of the two thermal masses. The thermal masses of the first and second subcells preferably differ from each other by not more than 1% of the lesser of the two thermal masses.

As a result, the two subcells can be heated to the same extent and the temperature distribution achievable in the subcells can be symmetrical relative to the insulating body.

One preferred embodiment further comprises:

- a third subcell which is designed for electrochemically storing electrical energy; and
- a second insulating body for thermally insulating the second subcell and the third subcell from each other, said body being arranged in an interspace between the second and third subcells that is confined by a side face of the second subcell and a side face of the third subcell,
- wherein the second insulating body comprises a second thermally insulating material having a thermal conductivity of at most 1 W/(m·K) and comprises a second heating structure which is designed to heat the second subcell and the third subcell, and
- wherein the second electrical insulating body is electrically insulated both from the second subcell and from the third subcell. The second thermally insulating material as well is preferably of low flammability.

As a result, the energy stored in the cell can be increased further, the cell can be heated more rapidly, and the risk of thermal runaway can be reduced.

In one preferred embodiment, the second thermally insulating material has a thermal conductivity which is less than 0.3 W/(m·k). As a result, the risk of thermal runaway of the cell can be minimized.

The second thermally insulating material may be designed as a plate. This plate may have two opposite surfaces. The surfaces may each face one of the interspace-confining side faces of the second and third subcells. The second heating structure may comprise two heating elements, each arranged on one of the opposite surfaces. Furthermore, a heating element may cover at least 50% of the surface on which it is arranged. Each position on a surface which is not covered by the heating element arranged on that surface may also correspond to an opposite point on the other surface which is covered by at least part of the heating element arranged on that surface. At least one of the heating elements of the second heating structure may comprise aluminum.

Alternatively, the second thermally insulating material may be formed of two plates, and the second heating structure has a heating element arranged at least sectionally between these two plates.

In one preferred embodiment, the first subcell and the third subcell each have a thermal mass,

- the thermal masses of the first and third subcells differ from each other by not more than 5% of the lesser of the two thermal masses; and
- the second subcell has a thermal mass which differs by not more than 5% from twice the thermal mass of the third subcell. The thermal masses of the first and third subcells preferably differ from each other by not more than 1% of the lesser of the two thermal masses; and/or the second subcell has a thermal mass which differs by not more than 1% from twice the thermal mass of the third subcell.

As a result, all three subcells can be heated to the same extent and a substantially homogeneous temperature distribution in the subcells can be achieved.

In one preferred embodiment, the first insulating body and the second insulating body have the same structural form.

As a result, the cell can be constructed efficiently and cost-effectively.

In one preferred embodiment, the first subcell and the second subcell each comprise: a first electrode, a second electrode, which has a higher electrical potential than the first electrode, and a separator arranged between the two electrodes;

- the first insulating body is surrounded on all sides, with the exception of one or more electrical terminals connected to the first heating structure, by an electrolyte-stable foil;
- the electrolyte-stable foil electrically insulates at the same time the first insulating body from the first subcell and from the second subcell; and
- the first subcell, the second subcell, and the part of the first insulating body that is arranged in the interspace between the first and second subcells and is surrounded by the electrolyte-stable foil is immersed in a liquid electrolyte. The electrolyte-stable foil may comprise the following: Kapton, PET (polyethylene terephthalate), PEN (polyethylenenaphthalate), PP (polypropylene), PE (polyethylenes).

As a result, a cell comprises a liquid electrolyte can be heated cell-internally (i.e., by the heating structure provided in the first and/or second insulating body).

In one preferred embodiment, the first subcell and the second subcell each comprise: a first electrode, a second electrode, which has a higher electrical potential than the first electrode, and a solid-stated electrolyte arranged between the two electrodes.

As a result, a cell with a solid-state electrolyte can be heated.

In one preferred embodiment, the first thermally insulating material further comprises one of the following properties or a combination thereof: compressible, elastic, or low flammability according to DIN 4102-1. The second thermally insulating material as well may comprise one of these properties or a combination thereof.

As a result, the insulating body can accommodate—in particular also elastically—the bulging of the subcells during charging or discharging procedures. Or the thermally insulating material may retain its thermal insulation properties for a long time even on overheating.

A second aspect of the invention relates to a battery comprising a cell of the invention.

The features and advantages elucidated in relation to the first aspect of the invention are also valid correspondingly for the second aspect of the invention.

A third aspect of the invention relates to a vehicle comprising a battery of the invention.

As a result, a vehicle, more particularly one with electric drive, may be provided that is safe and attains its full performance rapidly even at low temperatures.

Further advantages, features, and possible applications of the present invention are apparent from the detailed description below, in conjunction with the figures.

BRIEF DESCRIPTION OF THE DRAWINGS

FIG. 1*a* shows schematically a cell for electrochemically storing electrical energy according to a first embodiment;

FIG. 1*b* shows schematically the inner structure of an insulating body for thermally insulating and for heating two subcells of a cell;

FIG. 1*c* shows schematically a heating element provided in an insulating body for heating two subcells;

DETAILED DESCRIPTION OF THE DRAWINGS

Figure 2:
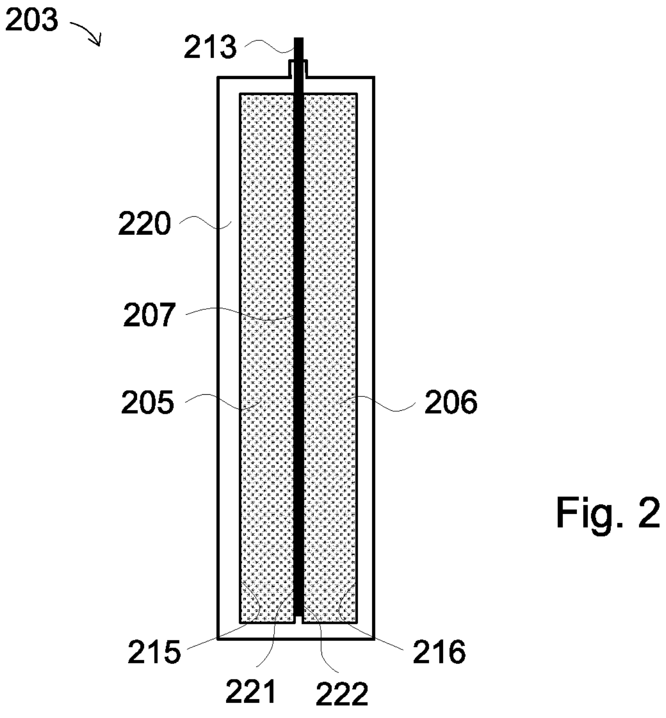
FIG. 2 shows schematically the inner structure of another insulating body for thermally insulating and for heating two subcells.

FIG. 1*a* shows schematically a cell 100 for electrochemically storing electrical energy according to a first embodiment. The cell 100 comprises: a subcell 101 and a subcell 102, each designed for electrochemically storing electrical energy; and an insulating body 103 for thermally insulating the subcell 101 and the subcell 102 from each other. The insulating body 103 is arranged in an interface, confined by a side face 111 of the subcell 101 and a side face 112 of the subcell 102, between the subcells 101 and 102. In order to prevent, or at least retard for a sufficiently long time, the spreading of thermal runaway from one subcell to the other, the insulating body 103 comprises a thermally insulating material having a thermal conductivity of at most 1.0 W/(m·k). The thermal conductivity of the thermally insulating material is preferably less than 0.3 W/(m·k). The thermally insulating material may comprise: glass fiber, Kevlar, mica. Furthermore, the insulating body 103 is electrically insulated both from the subcell 101 and from the subcell 102.

The insulating body 103 is additionally designed to heat the subcell 101 and the subcell 102. For this purpose, it comprises a heating structure with two electrical terminals 113 and 114 via which the heating structure can be connected to a power source. To heat the subcells, the heating structure is connected to the power source, and the heat generated in the heating structure is transmitted to the subcells adjacent to the insulating body, substantially through thermal conduction. The heating structure and/or the power source are configured such that during heating of the subcells, the temperature of the heating structure (heating temperature) is restricted to a mandated value. This mandated value is made such on the one hand as to prevent overheating of one of the two subcells 101 and 102 (which could trigger thermal runaway in the overheated subcell), and such on the other hand as to heat the two subcells 101 and 102 as rapidly as possible to their optimal operating temperature.

FIG. 1*b* shows schematically a section through the insulating body 103 in a plane which is perpendicular to the (interspace-confining) side faces 111 and 112 and which goes through the electrical terminal 113. According to this figure, i) the thermally insulating and low-flammability material is designed as a plate 105, which has a surface 115 and a surface 116 opposite said surface 115; ii) the heating structure comprises two heating elements 107 and 108, which are each arranged on one of the opposite surfaces 115 and 116; and iii) the plate and the heating structure are clad with an electrically insulating foil 120, with the exception of the electrical terminals. Via the electrical terminals, the heating elements 107 and 108 are connectable to a power source and may be connected in series or parallel. The plate 105 is preferably cuboidal. The electrically insulating foil 120 is electrolyte-resistant and may comprise: Kapton, PET, PEN, PP, PE.

FIG. 1*c* shows a plan view of the surface 115. It shows a serpentine arrangement of the heating element 107 on the surface 115, the connection thereof to the electrical terminal 113, and an electrical connecting lead 117 which (in the case of a series circuit) connects the heating element 107 to the heating element 108 arranged on the surface 116. The heating element 108 may likewise be arranged in a serpentine manner on the surface 116 and is connected to the electrical terminal 114. This is not shown in the figures. A heating element may comprise: nickel, copper, aluminum, graphene-silver, silver paste as printed conductor track.

Advantageously, the heating element 107 covers at least 50% of the surface 115 and/or the heating element 108 covers at least 50% of the surface 116. It is advantageous, furthermore, if the (serpentine) course of the heating elements 107 and 108 is chosen such that each position on the surface 115 which is not covered by the heating element 107 has a corresponding opposite position on the surface 116 which is covered by at least part of the heating element 108. As a result, the thermal conductivity of the insulating body 103 can be further lowered.

In the cell 100, the surface 115 faces the side face 111, and so the heating element 107 is arranged closer to the subcell 101 than to the subcell 102. The thermal resistance of the heating element 107 toward the subcell 102, as a result of the thermally insulating plate 105, is also substantially higher than the thermal resistance of the heating element 107 toward the subcell 101. All of this means that the heat generated by the heating element 107 propagates predominantly in the direction of the subcell 101 and contributes to heating said subcell 101. In an analogous way, the heat generated by the heating element 108 propagates predominately in the direction of the subcell 102 and contributes primarily to heating said subcell 102. The temperature to which each of the heating elements 107 and 108 must be heated in order to bring the subcells 101 and 102 to their optimal operating temperature may be lower to 70° or below. At this temperature, there is no likelihood of thermal runaway triggered by the heating elements.

The heat generated by the heating element 107 on heating of the cell 100 therefore corresponds substantially to the heat needed in order to heat the subcell 101 to the optimal operating temperature. In analogy, the heat generated by the heating element 108 corresponds substantially to the heat needed to heat the subcell 102 to the optimal operating temperature. Advantageously, the thermal masses (heat capacities) of the subcells 101 and 102 are the same. In that case, given equal heating power of the heating elements 107 and 108, it is possible in the cell to achieve a temperature distribution that is symmetrical relative to the insulating body, and to achieve substantially uniform heating of the cell.

The subcells of a cell are, for example, lithium-ion cells and may be designed as a cell stack or jelly roll. For example, the subcells 101 and 102 may be designed as follows: both as a cell stack, both as a jelly roll, one as a cell stack and the other as a jelly roll. Furthermore, each subcell of a cell comprises: a first electrode, a second electrode, which has a higher electrical potential than the first electrode, and a separator or a solid-state electrolyte which is arranged between the two electrodes. In the case of a cell with a liquid electrolyte, the foil which dads the thermally insulating material and the heating structure is also electrolyte-stable.

A modification of the first embodiment may be achieved by replacing the insulating body 103 with another insulating body 203, which is shown schematically in FIG. 2. The insulating body 203 also comprises a thermally insulating material having a thermal conductivity of at most 1.0 W (m·k) and is electrically insulated from the subcells. The thermal conductivity of the thermally insulating material is preferably less than 0.3 W (m·k). The thermally insulating material may comprise: glass fiber, Kevlar, mica.

The insulating body 203 is designed to heat the subcells adjacent to it, and comprises a heating structure having two electrical terminals 213. To heat the subcells, the heating structure is connected to a power source, and the heat generated in the heating structure is transmitted to the subcells substantially through thermal conduction. The heating temperature is confined to a mandated value in order to prevent overheating of the cell.

FIG. 2 shows a section through the insulating body 203 in a plane which is perpendicular to the plane containing the heating structure, and which goes through one of the electrical terminals 213. The thermally insulating material of the insulating body 203 is formed from two parallel, mutually facing and low-flammability plates 205 and 206, and the heating structure comprises a heating element 207 arranged between the two plates. The plates 205 and 206 and the heating structure, with the exception of the electrical terminals 213, are clad with an electrically insulating and electrolyte-stable foil 220. Each of the plates 205 and 206 has two opposite, parallel surfaces: the plate 205 has the surfaces 215 and 221, the plate 206 the surfaces 216 and 222. The heating element 207 is arranged on one of the surfaces, 221 or 222, in the same way as the heating element 107 shown in FIG. 1*c*, for example. Advantageously, the heating element 207 covers at least 50% of the surface and/or comprises at least one of the following: nickel, copper, aluminum, graphene-silver, silver paste as printed conductor track. The plates 205 and 206 are preferably cuboidal and/or have the same structural form.

A cell according to the modified first embodiment—which is not represented in the figures—therefore comprises: a first subcell and a second sub cell, which are each designed for electrochemically storing electrical energy; and the insulating body 203 for thermally insulating the first subcell and the second subcell, which is arranged in an interspace, confined by a side face of the first subcell and a side face of the second subcell, between the first and second subcells. Here, the surface 215 faces the interspace-confining side face of the first subcell, and the surface 216 faces the interspace-confining side face of the second subcell.

Because, in the case of a cell according to the modified first embodiment, there is a thermally insulating plate between the heating element 207 and each of the subcells, the heating temperature of the heating element 207 is higher than for the heating elements of the insulating body 103. Heating of the subcells with a safety and rapidity comparable with that of the insulating body 103 is achievable with the insulating body 203 if its heating temperature is situated in a range between 120° C. and 150° C.

Advantageously, the thermal masses of the first subcell and of the second subcell are the same. As a result it is possible to achieve substantially uniform heating.

Figure 3:
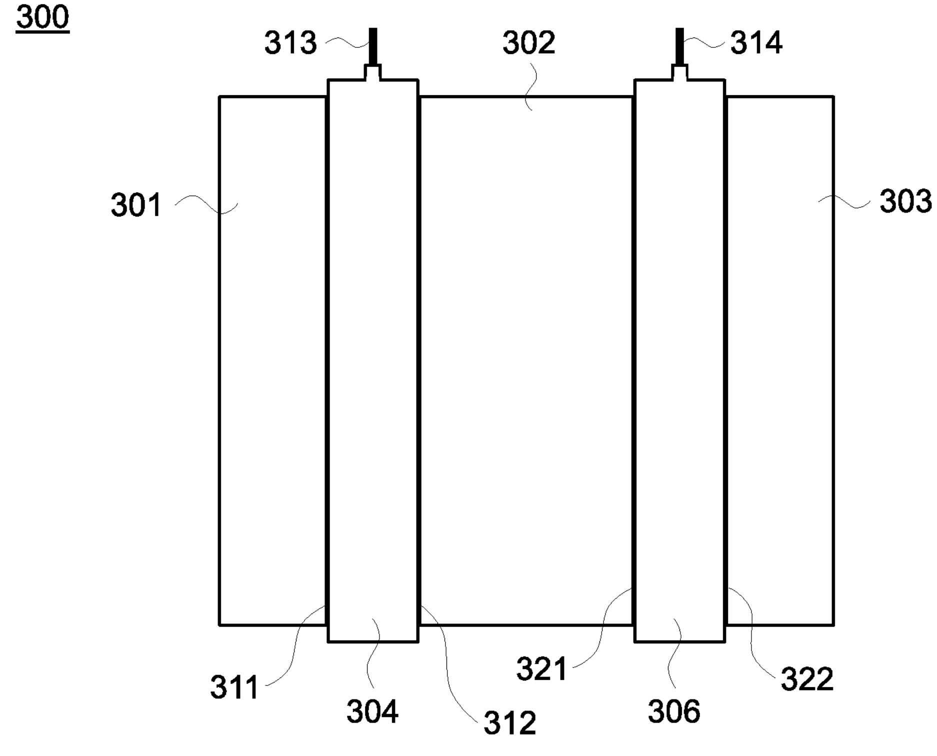
FIG. 3 shows schematically a cell for electrochemically storing electrical energy according to a second embodiment.

FIG. 3 shows schematically a cell 300 for electrochemically storing electrical energy according to a second embodiment. The cell 300 comprises: a subcell 301, a subcell 302, and a subcell 303, each designed for electrochemically storing electrical energy; an insulating body 304 for thermally insulating the subcell 301 and the subcell 302 from each other; and an insulating body 306 for thermally insulating the subcell 302 and the subcell 303 from each other. The insulating body 304 is arranged in an interspace, confined by a side face 311 of the subcell 301 and a side face 312 of the subcell 302, between the subcells 301 and 302; and the insulating body 306 is arranged in an interspace, confined by a side face 321 of the subcell 302 and a side face 322 of the subcell 303, between the subcells 302 and 303. The insulating bodies 304 and 306 are electrically insulated from the subcells and each comprise electrical terminals 313 and 314 via which they are connectable to a power source.

Each of the insulating bodies 304 and 306 is designed like one of the insulating bodies 103 or 203. Consequently, their structure is not further addressed. The insulating bodies 304 and 306 may have the same structural form, more particularly an identical design.

Advantageously, the thermal masses of the subcell 301 and of the subcell 303 are the same and the subcell 302 has a thermal mass two times greater than one of the subcells 301 and 303. Given identical heating power of the heating structures integrated into the insulating body, it is possible in that case to realize substantially uniform heating of the subcells 301, 302 and 303.

A cell according to the third embodiment—which is not represented in the figures—comprises: n subcells, where n is a natural number, which are each designed for electrochemically storing electrical energy; and n−1 insulating bodies, which are electrically insulated from the n subcells and are each designed like one of the insulating bodies 103 or 203. Each kth insulating body, where k adopts natural values between 1 and n−1, is provided for thermally insulating the kth subcell and the k+1th subcell and is arranged in an interspace, confined by a side face of the kth subcell and a side face of the k+1th subcell, between the kth and the k+1th subcells. The n−1 insulating bodies preferably have the same structural form.

Advantageously, the thermal masses of the first and nth subcells differ from each other by not more than 5%, preferably 1%, of the lesser of the thermal masses of the first and nth subcells; the thermal masses of all other subcells (that is of the second, of the third, . . . and of the (n−1)th subcell) differ from each other by not more than 5%, preferably 1%, of the lesser of the thermal masses of the other subcells; and the thermal masses of the other subcells differ from each other in each case by not more than 5%, preferably 1%, of twice the thermal mass of the lesser of the thermal masses of the first and nth subcells. The thermal masses of the first and nth subcells are preferably the same; the thermal masses of all the other subcells (that is of the second, of the third, . . . and of the (n−1)th subcell) are preferably the same; and the thermal masses of the other subcells are in each case two times greater than the thermal mass of the first or nth subcell. For a given heating power of the n−1 heating elements, it is then possible to achieve substantially uniform heating of the n subcells.

Advantageously, the thermally insulating material in which the plate 105 or the plates 205 and 206 is or are designed is compressible such that it is able to accommodate the bulging of the subcells. It is advantageous, furthermore, if the thermally insulating material has low flammability (according to DIN 4102-1, for example).

Whereas, above, at least one illustrative embodiment has been described, it should be noted that a large number of variations thereon exist. It should also be borne in mind that the illustrative embodiments described represent only non-limiting examples, and there is no intention thereby to restrict the scope, the applicability or the configuration of the methods and apparatuses described here. Instead, the description above will give the skilled person an instruction on the implementation of at least one exemplary embodiment, it being understood that various alterations in the functioning and in the arrangement of the elements described in one illustrative embodiment can be made without departing from the subject matter specified in each of the appended claims or from the legal equivalents of that subject matter.

LIST OF REFERENCE SIGNS

100 Cell
101, 102 Subcells
103 Insulating body
105 Thermally insulating material (plate)
107, 108 Heating elements of a heating structure
111, 112 Side faces of two adjacent subcells that confine the interspace between these two subcells
113, 114 Electrical terminals
115, 116 Surfaces of the thermally insulating material
117 Electrical connection
120, 220 Electrically insulating and electrolyte-stable foil
203 Insulating body
205, 206 Thermally insulating and low-flammability plates
207 Heating element of another heating structure
213 Electrical terminals
215, 221 Surfaces of a thermally insulating plate
216, 222 Surfaces of another thermally insulating plate
300 Cell
301 . . . 303 Subcells
304, 306 Insulating body
311, 312 Side faces of two adjacent subcells that confine the interspace between these two subcells
313, 314 Electrical terminals
321, 322 Side faces of two other adjacent subcells that confine the interspace between these two subcells

The invention claimed is:

1. A cell for electrochemically storing electrical energy, the cell comprising:

a first subcell and a second subcell which are each designed for electrochemically storing electrical energy; and a first electrolyte-stable insulating body for thermally insulating the first subcell and the second subcell from each other, said body being arranged in an interspace between the first and second subcells that is confined by a side face of the first subcell and a side face of the second subcell, wherein the first insulating body includes a first thermally insulating material having a thermal conductivity of at most 1 W/(m·K) and includes a first heating structure which is designed to heat the first subcell and the second subcell, wherein the first insulating body is electrically insulated both from the first subcell and from the second subcell, wherein the first subcell and the second subcell each comprise: a first electrode, a second electrode, having a higher electrical potential than the first electrode, and a separator arranged between the two electrodes;

wherein the first insulating body is surrounded on all sides, with the exception of one or more electrical terminals connected to the first heating structure, by an electrolyte-stable foil;

wherein the electrolyte-stable foil electrically insulates at a same time the first insulating body from the first subcell and from the second subcell; and wherein the first subcell, the second subcell, and the part of the first insulating body that is arranged in the interspace between the first and second subcells and is surrounded by the electrolyte-stable foil are immersed in a liquid electrolyte.

2. The cell according to claim 1, wherein the first heating structure comprises two heating elements, the first thermally insulating material is designed as a plate which has a first surface and a second surface opposite the first surface, the first surface and the second surface each face one of the interspace-confining side faces of the first and second subcells, and a heating element of the first heating structure is arranged on each of the first surface and the second surface.

3. The cell according to claim 2, wherein the heating element arranged on the first surface covers at least 50% of the first surface; or the heating element arranged on the second surface covers at least 50% of the second surface.

4. The cell according to claim 3, wherein each point on the first surface which is not covered by the heating element arranged on the first surface has a corresponding opposite point on the second surface which is covered by at least part of the heating element arranged on the second surface.

5. The cell according to claim 2, wherein at least the heating element arranged on the first surface comprises aluminum.

6. The cell according to claim 1, wherein the first thermally insulating material is formed from two plates, and the first heating structure has a heating element arranged at least sectionally between the two plates.

7. The cell according to claim 1, wherein the first subcell and the second subcell each have a thermal mass, and the thermal masses of the first and second subcells differ from each other by not more than 5% of the lesser of the two thermal masses.

8. The cell according to claim 7, wherein the thermal masses of the first and second subcells differ from each other by not more than 1% of the lesser of the two thermal masses.

9. The cell according to claim 1, further comprising:

a third subcell which is designed for electrochemically storing electrical energy; and a second insulating body for thermally insulating the second subcell and the third subcell from each other, said body being arranged in an interspace between the second and third subcells that is confined by a side face of the second subcell and a side face of the third subcell, wherein the second insulating body includes a second thermally insulating material having a thermal conductivity of at most 1.0 W/(m·K) and includes a second heating structure which is designed to heat the second subcell and the third subcell, and wherein the second insulating body is electrically insulated both from the second subcell and from the third subcell.

10. The cell according to claim 9, wherein the first subcell and the third subcell each have a thermal mass, the thermal masses of the first and third subcells differ from each other by not more than 5% of the lesser of the two thermal masses; and the second subcell has a thermal mass which differs by not more than 5% from twice the thermal mass of the third subcell.

11. The cell according to claim 10, wherein the thermal masses of the first and third subcells differ from each other by not more than 1% of the lesser of the two thermal masses; and the second subcell has a thermal mass which differs by not more than 1% from twice the thermal mass of the third subcell.

12. The cell according to claim 9, wherein the first insulating body and the second insulating body have the same structural form.

13. The cell according to claim 1, wherein the first subcell and the second subcell each comprise: a first electrode, a second electrode, which has a higher electrical potential than the first electrode, and a solid-state electrolyte which is arranged between the two electrodes.

14. The cell according to claim 9, wherein the first thermally insulating material or the second thermally insulating material further comprises one of the following properties or a combination thereof: compressible, elastic, of low flammability according to DIN 4102-1.

15. The cell according to claim 9, wherein the first thermally insulating material has a thermal conductivity which is less than 0.3 W/(m·K), or the second thermally insulating material has a thermal conductivity which is less than 0.3 W/(m·K).

16. A battery comprising a cell according to claim 1.

17. A vehicle comprising a battery according to claim 16.

* * * * *